(12) United States Patent
Yuan (10) Patent No.: US 12,275,450 B2
(45) Date of Patent: Apr. 15, 2025

(54) STROLLER WITH LINKAGE-FOLDABLE BACKREST

(71) Applicant: WONDERLAND SWITZERLAND AG, Steinhausen (CH)

(72) Inventor: Jialiang Yuan, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/520,758

(22) Filed: Nov. 28, 2023

(65) Prior Publication Data

US 2024/0092414 A1 Mar. 21, 2024

Related U.S. Application Data

(63) Continuation of application No. 17/381,394, filed on Jul. 21, 2021, now Pat. No. 11,866,085.

(30) Foreign Application Priority Data

Jul. 21, 2020 (CN) .......................... 202010707715.6

(51) Int. Cl.
*B62B 9/10* (2006.01)
*B62B 7/00* (2006.01)
*B62B 7/10* (2006.01)

(52) U.S. Cl.
CPC .............. *B62B 9/104* (2013.01); *B62B 7/004* (2013.01); *B62B 7/10* (2013.01)

(58) Field of Classification Search
CPC ........... B62B 9/104; B62B 7/004; B62B 7/10; B62B 7/064; B62B 7/06; B62B 9/106; B62B 9/102; B62B 9/12; B62B 7/006
See application file for complete search history.

(56) References Cited

U.S. PATENT DOCUMENTS 5,246,272 A * 9/1993 Kato ...................... B62B 9/104
297/354.12
5,662,380 A * 9/1997 Tam ........................ B62B 9/102
297/440.11

(Continued)

FOREIGN PATENT DOCUMENTS

CN 201721488 U 1/2011
CN 202541586 U 11/2012

(Continued)

OTHER PUBLICATIONS

"First Office Action Issued in Corresponding Chinese Patent Application No. 202010707715.6", Mailed Date: Mar. 27, 2024, 15 pages.

(Continued)

*Primary Examiner* — James A Shriver, II
*Assistant Examiner* — Ian Bryce Shelton
(74) *Attorney, Agent, or Firm* — Volpe Koenig (57) ABSTRACT

The stroller with a linkage-foldable backrest having a stroller frame convertible between an unfolded state and a folded state is provided. The folding of the stroller frame of the provided stroller drives the backrest portion to fold, so as to prevent the edge of the end portion of the backrest portion from touching the ground. The folding operation of the backrest portion according to the present invention is simple and convenient.

22 Claims, 5 Drawing Sheets

(56) References Cited

U.S. PATENT DOCUMENTS

| | | | | |
|---|---|---|---|---|
| 5,752,738 | A | * 5/1998 | Onishi | B62B 7/08 |
| | | | | 297/380 |
| 10,172,736 | B1 | * 1/2019 | Kayser | B62B 9/24 |
| 10,407,090 | B2 | * 9/2019 | Driessen | B62B 9/104 |
| 2003/0227158 | A1 | * 12/2003 | Kassai | B62B 9/104 |
| | | | | 280/642 |
| 2004/0145224 | A1 | * 7/2004 | Kassai | B62B 9/104 |
| | | | | 297/219.12 |
| 2007/0052208 | A1 | * 3/2007 | Chen | B62B 7/123 |
| | | | | 280/642 |
| 2011/0089670 | A1 | 4/2011 | Gilles | |
| 2016/0101802 | A1 | * 4/2016 | Zhong | A47D 11/005 |
| | | | | 280/47.4 |
| 2018/0162437 | A1 | * 6/2018 | Mostert | B62B 9/102 |
| 2020/0172142 | A1 | * 6/2020 | Young | B62B 7/142 |
| 2020/0216108 | A1 | * 7/2020 | Li | B62B 7/08 |
| 2020/0239053 | A1 | * 7/2020 | Holleis | A47C 4/00 |
| 2020/0377136 | A1 | * 12/2020 | Kho | B62B 7/08 |
| 2021/0045543 | A1 | * 2/2021 | Fang | B62B 9/104 |
| 2021/0061332 | A1 | * 3/2021 | Sturgeon | B62B 9/142 |
| 2022/0024509 | A1 | 1/2022 | Yuan | |

FOREIGN PATENT DOCUMENTS

| | | | | |
|---|---|---|---|---|
| CN | 104843044 | A | 8/2015 | |
| CN | 105564485 | A * | 5/2016 | B62B 7/083 |
| CN | 106043399 | A | 10/2016 | |
| CN | 108974096 | A * | 12/2018 | B62B 9/102 |
| CN | 110116746 | A * | 8/2019 | B62B 7/06 |
| CN | 110271597 | A * | 9/2019 | B62B 7/06 |
| CN | 110667684 | A * | 1/2020 | B62B 7/062 |
| CN | 210310520 | U | 4/2020 | |
| CN | 111086548 | A * | 5/2020 | |
| CN | 210882280 | U * | 6/2020 | B62B 7/06 |
| JP | H08183460 | A | 7/1996 | |
| KR | 102089895 | B1 | 3/2020 | |
| TW | M275137 | U | 9/2005 | |
| WO | WO-2017160150 | A1 * | 9/2017 | B62B 7/064 |
| WO | WO-2018039208 | A1 * | 3/2018 | B60N 2/2812 |

OTHER PUBLICATIONS

"Notice of Allowance Issued in Corresponding Chinese Patent Application No. 202010707715.6", Mailed Date: Jan. 23, 2025, 6 pages.

* cited by examiner

STROLLER WITH LINKAGE-FOLDABLE BACKREST

This application is a Continuation of, and claims priority under 35 U.S.C. § 120 to, U.S. patent application Ser. No. 17/381,394, filed Jul. 21, 2021, and claims priority therethrough under 35 U.S.C. § 119 to Chinese Patent Application No. 202010707715.6, filed Jul. 21, 2020, the entireties of which are incorporated by reference herein.

BACKGROUND OF THE INVENTION

Field of the Invention

The present invention relates to a stroller, and more particularly to a stroller with a linkage-foldable backrest.

Description of the Prior Art

Strollers are extensively applied in families with babies and infants. In order to provide strollers with better storage and portability, most current strollers include stroller frames convertible between a folded state and an unfolded state, so as to allow the strollers to be folded to exhibit a smaller volume. However, backrests of current strollers are mostly provided in a fixed type, which renders the backrests to be non-foldable. Thus, when a stroller frame is folded, the edge of end portion of the backrest will touch the ground, such that the backrest of the stroller may become dirty and the user experience may be significantly degraded. There are backrests provided with multiple pivotal structures for achieving the foldability; however, this increases the complexity in the structure of strollers and the folding of the backrests may become unsmooth.

Therefore, there is a need for a stroller having a linkage-foldable backrest so as to overcome the deficiency of the existing strollers.

SUMMARY OF THE INVENTION

It is an object of the present invention to provide a stroller with a linkage-foldable backrest, in which the folding of a stroller frame of the stroller drives a backrest portion to fold in a simple and convenient manner, so as to prevent the end portion of the backrest portion from touching the ground.

To achieve the object above, the present invention provides a stroller with a linkage-foldable backrest, which includes a stroller frame convertible between an unfolded state and a folded state, and a support provided on the stroller frame. The support includes a seat portion and a backrest portion that can be mutually folded and unfolded, and the seat portion and the backrest portion may mutually unfold and fold in synchronization relative to the stroller frame. The backrest portion has a bending area, and the stroller includes a connecting member of a flexible structure connected between the backrest portion and the stroller frame. The folding of the seat portion relative to the backrest portion drives the bending area to bend in a direction away from the ground by the pulling of the connector on the backrest portion, reducing a distance between an upper edge and a lower edge of the backrest portion.

Compared to the existing strollers, the backrest portion of the stroller according to the present invention is provided with the bendable bending area, and a connecting member of a flexible structure connected between the backrest portion and the stroller frame. When the stroller frame of the stroller having a linkage-foldable backrest is folded, the seat portion and the backrest portion are folded in synchronization. During the folding process, the connecting member connected between the stroller frame and the backrest portion may pull the backrest portion so that the bending area will bend in a direction away from the ground, further reducing the distance between the upper edge and the lower edge of the backrest portion, thereby achieving folding of the backrest portion and preventing the edge of an end portion of the backrest from touching the ground. Hence, the folding of the stroller frame of the stroller of the present invention drives the backrest portion to fold in a simple and convenient manner, and the folding of the backrest portion prevents the edge of an end portion of the backrest portion from touching the ground.

Preferably, the connecting member of a flexible structure is connected between the backrest portion and the seat portion on the stroller frame.

Preferably, the backrest portion has a bending area formed between the upper edge and the lower edge of the backrest portion. More specifically, the bending area is formed at a center area of the backrest portion.

Preferably, the bending area includes an upper backrest portion and a lower backrest portion, and the connecting member is connected to the lower backrest portion.

Preferably, the backrest portion includes a backrest plate and a backrest protection cover of a flexible structure, wherein the backrest protection cover covers the backrest plate.

Preferably, the backrest plate includes an upper backrest plate corresponding to the upper backrest portion and a lower backrest plate corresponding to the lower backrest portion.

Preferably, the backrest plate includes an unfolding-folding portion, and the upper backrest plate and the lower backrest plate are connected by the unfolding-folding portion.

Preferably, the unfolding-folding portion forms the bending area of the backrest portion.

Preferably, the unfolding-folding portion provides a bendable linkage connection between the upper backrest plate and the lower backrest plate.

Preferably, the folding of the seat portion relative to the lower backrest plate drives the upper edge of the backrest plate away from the ground through the linkage connection provided by the unfolding-folding portion.

Preferably, the unfolding-folding portion is formed of a flexible structure.

Preferably, the unfolding-folding portion is of a creased structure.

Preferably, the unfolding-folding portion is of a linear structure that is repeatedly bendable.

Preferably, the connecting member is connected to the backrest plate by means of fusion welding.

Preferably, the connecting member and the backrest protection cover are connected by means of sewing or by a rivet.

Preferably, the connecting member is in a symmetrical arrangement on the two sides of the backrest portion.

Preferably, the connecting member is a woven band.

Preferably, the woven band and the seat portion are fixedly connected by means of sewing or by a rivet.

Preferably, the woven band and the seat portion are detachably connected by mutually coordinating male and female buckles.

Preferably, the upper backrest plate is provided with a shoulder strap hole for a shoulder strap of a five-point safety belt to pass through.

Preferably, the upper backrest plate is provided with a top shoulder strap hole and a bottom shoulder strap hole in a top-bottom facing manner on two sides of the upper backrest plate, respectively, and the shoulder strap includes an upper node that is adjustable between the top shoulder strap hole and the bottom shoulder strap hole on the same side of the shoulder strap. Thus, the height at which the shoulder strap is applied for can be adjusted to adapt to the children of different heights.

Preferably, the stroller frame includes an armrest of a collapsible structure, which is collapsed at a portion corresponding to the bending area of the backrest portion.

DETAILED DESCRIPTION OF THE EMBODIMENTS

In order to describe the technical contents, the structural features and the technical effects of the present invention in more details, reference is made to the following description and embodiments in combination with the accompanying drawings.

Figure 1:
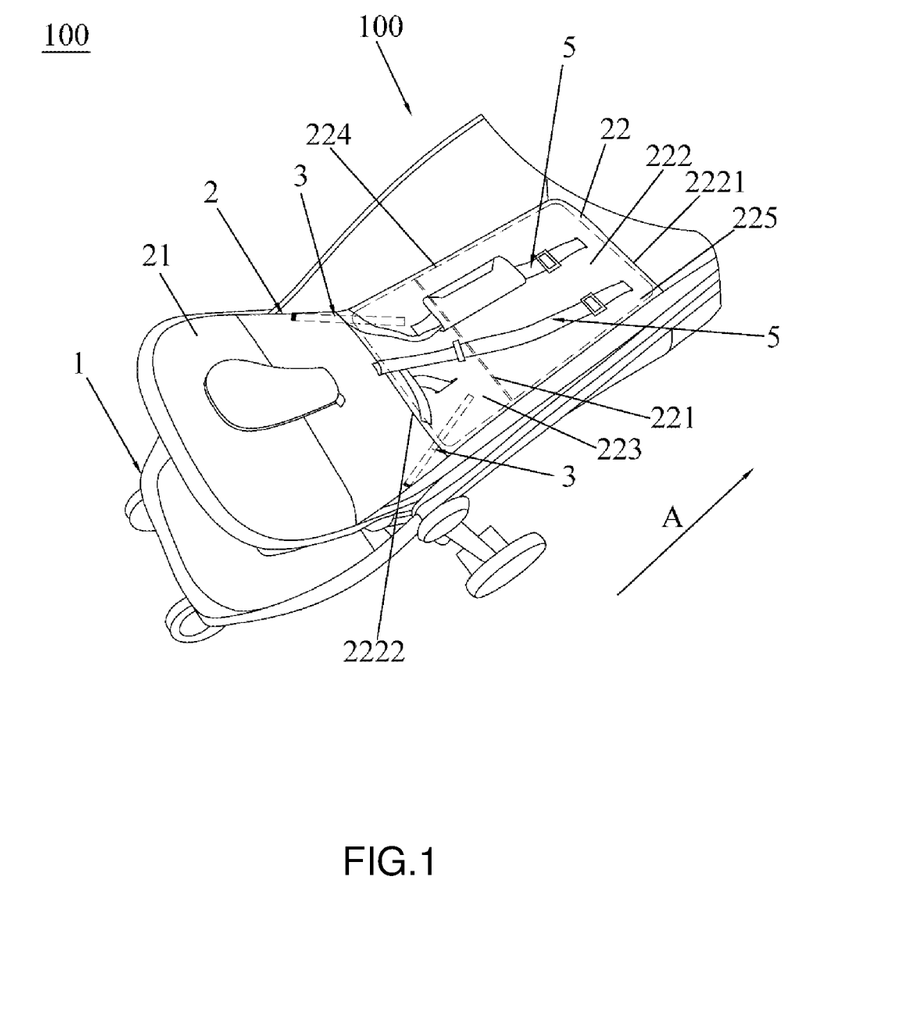
FIG. 1 is a schematic view showing the structure of a stroller with a linkage-foldable backrest, at an unfolded state, according to the present invention.
Figure 2:
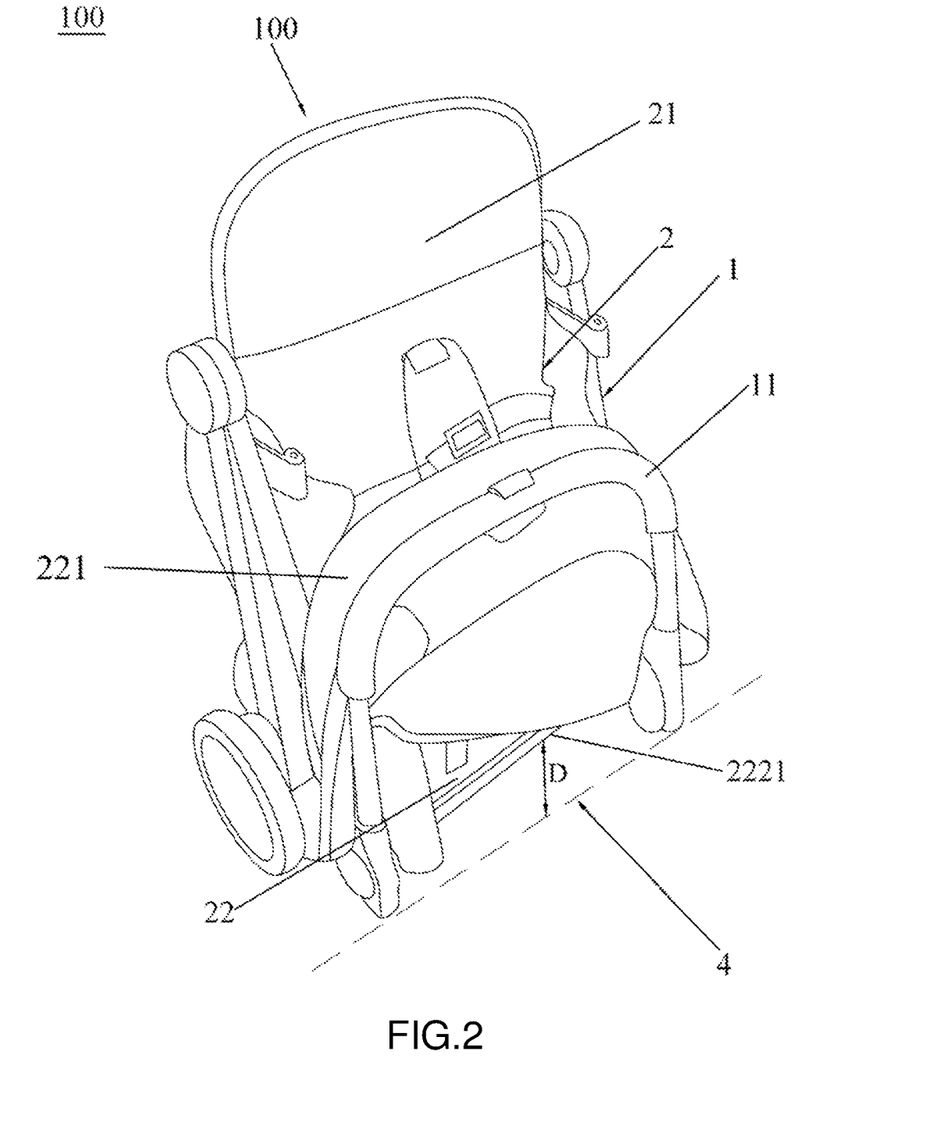
FIG. 2 is a schematic view showing the structure of the stroller, at a folded state, according to the present invention.

Referring to FIG. 1 and FIG. 2, the stroller 100 with a linkage-foldable backrest according to the present invention is shown. The stroller 100 includes a stroller frame 1 and a support 2 provided on the stroller frame 1. The stroller frame 1 is of a collapsible structure, which is convertible between an unfolded state and a folded state. The support 2 includes a seat portion 21 and a backrest portion 22 that can be mutually folded and unfolded. The seat portion 21 and the backrest portion 22 are mutually unfolded and folded in synchronization relative to the stroller frame 1. That is, the folding of the stroller frame 1 synchronously drives the seat portion 21 and the backrest portion 22 to fold. To enable the synchronous folding of backrest portion 22, the backrest portion 22 is provided with a bendable bending area 221, and the connecting member 3, which is of a flexible structure, is connected between the backrest portion 22 and the stroller frame 1. When the stroller frame 1 of the stroller 100 of the present invention is to be folded, the seat portion 21 and the backrest portion 22 may be folded synchronously. During the folding process of the stroller frame 1, the connecting member 3 connected between the stroller frame 1 and the backrest portion 22 is tightly straightened and then pulls the backrest portion 22. The flexibility of the connecting member 3 allows two ends of the connecting member 3 to be at any angle for adaptively adjusting to a corresponding shape during the folding process of the stroller frame 1. As the backrest portion 22 is pulled by the connecting member 3, the bending area 221 of the backrest portion 22 bends in a direction away from the ground 4, thus reducing a distance between an upper edge 2221 and a lower edge 2222 of the backrest portion 22 (the direction shown by the arrow A in FIG. 1 is referred to as the upper direction in the present invention). That is, folding of the backrest portion 22 is achieved. As shown in FIG. 2, the distance from the upper edge 2221 of the folded backrest portion 22 to the ground 4 is as indicated by D, such distance D preventing the upper edge 2221 of the backrest portion 22 from touching the ground. Hence, according to the present invention, the folding of the stroller frame 1 of the stroller 100 with a linkage-foldable backrest may drive the backrest portion 22 to fold, and thus prevent the upper edge 2221 of the backrest portion 22 from touching the ground. Besides, the folding operation of the backrest portion 22 is relatively simple and convenient.

Again referring to FIG. 1 and FIG. 2, to keep the appearance of the stroller 100 with a linkage-foldable backrest unaffected, the connecting member 3 is adopted to connect to the seat portion 21 on the stroller frame 1. That is, according to the present invention, the connecting member 3 which is of a flexible structure is connected between the backrest portion 22 and the seat portion 21 on the stroller frame 1. More specifically, there is a bending area 221 formed between the upper edge 2221 and the lower edge 2222 of the backrest portion 22. In order to allow the bending area 221 of the backrest portion 22 to more easily bend in a direction away from the ground 4, the bending area 221 is preferably formed in a center region of the backrest portion 22. Again referring to FIG. 1, the bending area 221 divides the backrest portion 22 into an upper backrest portion 222 and a lower backrest portion 223, and the connecting member 3 can be connected to the lower backrest portion 223 as well as the upper backrest portion 222. In order to allow the connecting member 3 to pull the backrest portion 22 in an easier way during the folding process of the stroller frame 1 so as to cause the bending area 221 to bend in a direction away from the ground, the connecting member 3 is preferably connected to the lower backrest portion 223. Considering seating comfort for babies, the backrest portion 22 of the present invention needs to have better softness and comfort, and so the backrest portion 22 of the present invention includes a backrest plate 224 and a backrest protection cover 225 of a flexible structure. The backrest protection cover 225 covers the backrest plate 224, and more particularly, the outside of the backrest plate 224. In such a manner, the folding of the backrest portion 22 may rely on the folding of the backrest plate 224. The specific structure of the backrest plate 224 will be further described in detail with reference to FIG. 3 below.

Figure 3:
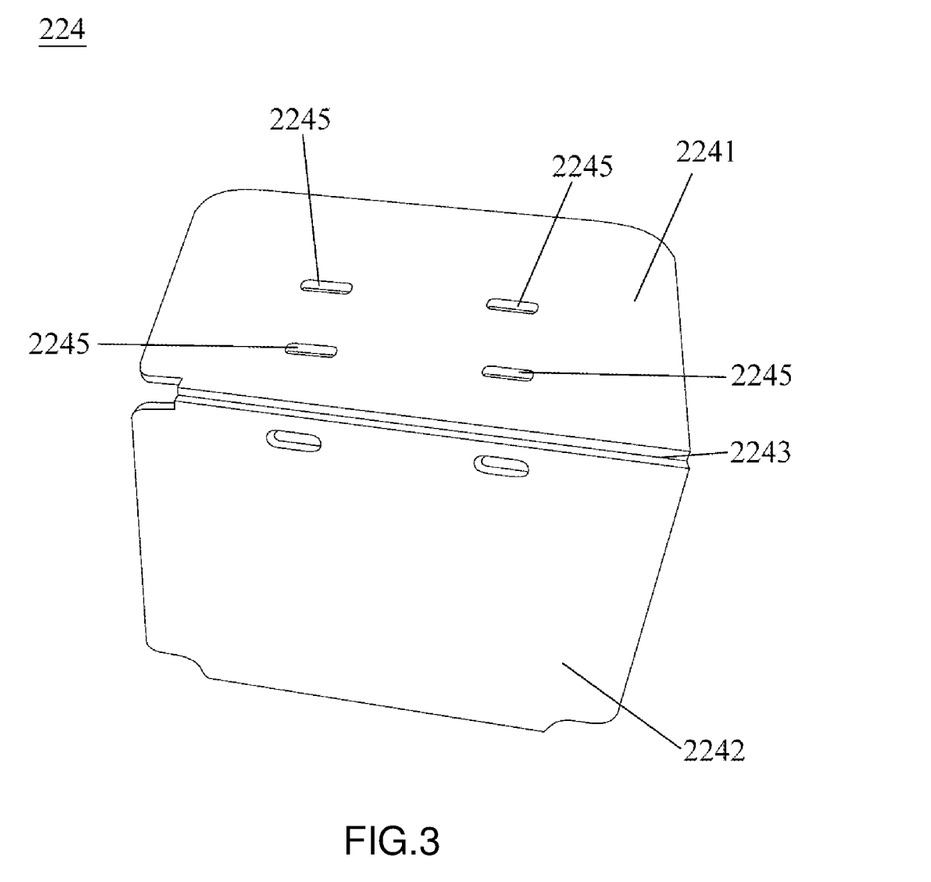
FIG. 3 is a schematic view showing the structure of a backrest plate of the stroller according to the present invention.

Referring to FIG. 3, the backrest plate 224 includes an upper backrest plate 2241 corresponding to the upper backrest portion 222 and a lower backrest plate 2242 corresponding to the lower backrest portion 223. The backrest plate 224 further includes an unfolding-folding portion 2243. The upper backrest plate 2241 and the lower backrest plate 2242 are connected with each other by the unfolding-folding portion 2243. To allow the backrest plate 224 to be linkage-folded when the stroller frame 1 is folded, the unfolding-folding portion 2243 can be bent by a forced exerted thereon, and thus a bendable linkage connection is provided between the upper backrest plate 2241 and the lower backrest plate 2242 through the unfolding-folding portion 2243. During the folding process of the backrest plate 224, the unfolding-folding portion 2243 is bent, that is, the unfolding-folding portion 2243 forms the bending area of the backrest portion 22, so that the end portion of the upper backrest plate 2241 near the unfolding-folding portion 2243 and the end portion of the lower backrest plate 2242 near the unfolding-folding portion 2243 may both arch upward. To allow the unfolding-folding portion 2243 to be bent by a force exerted thereon, the unfolding-folding portion 2243 is preferably formed of a flexible structure. More specifically, the unfolding-folding portion 2243 may be formed of a creased structure or may be formed of a linear structure that can be repeatedly bent. The folding of the backrest plate 224 will be described in further details with reference to FIG. 4a and FIG. 4b below.

Figure 4A:
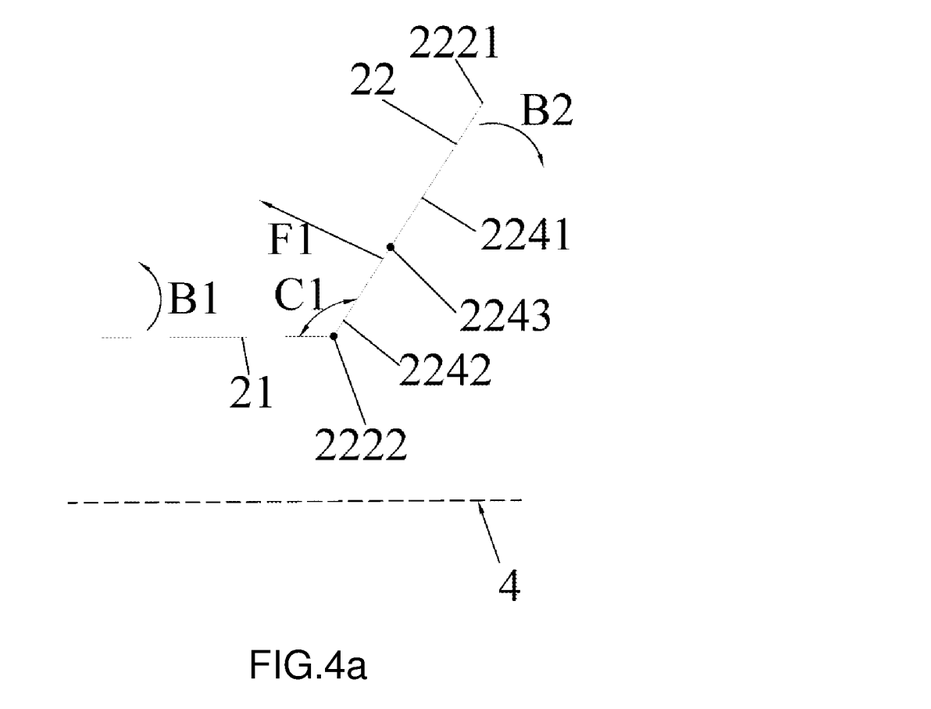
FIG. 4a is a schematic view illustrating the operation of the seat portion and the backrest portion, when unfolded, of the stroller according to the invention.
Figure 4B:
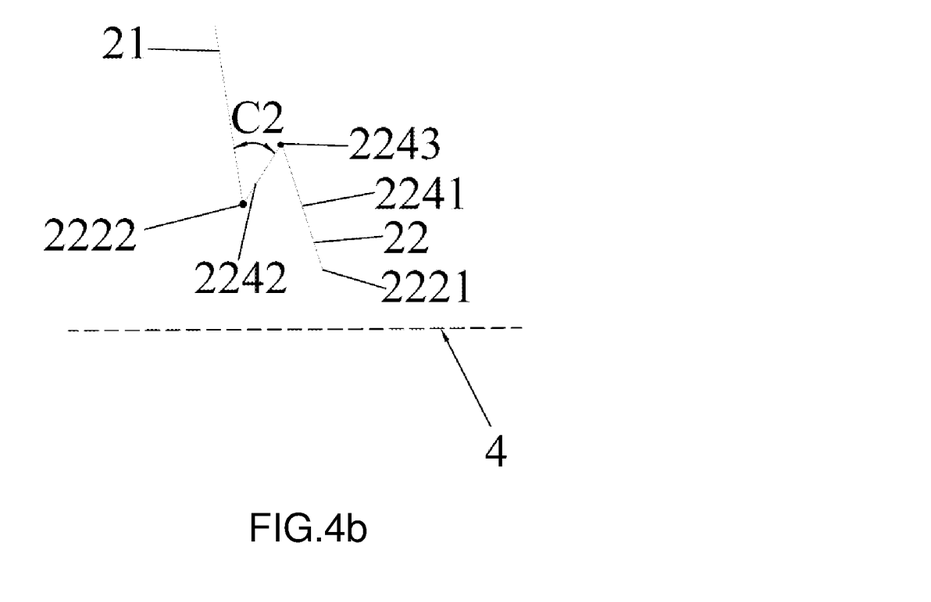
FIG. 4b is a schematic view illustrating the operation of the seat portion and the backrest portion, when folded, of the stroller according to the invention.

Please refer to FIG. 4a and FIG. 4b, in which FIG. 4A shows the operation of the seat portion 21 and the backrest portion 22, corresponding to the unfolded state of the stroller frame 1. When the stroller frame 1 is folded in a direction corresponding to those indicated by B1 and B2 in FIG. 4a, the seat portion 21 and the backrest portion 22 will be folded, thus showing the folded state as shown in FIG. 4b. More specifically, when being folded, the seat portion 21 will move in a direction as indicated by the arrow B1, and the backrest portion 22 will move in a direction as indicated by the arrow B2. Due to the pulling of the connecting member 3, there will be an upward pulling force F1 exerted on the end portion, near the unfolding-folding portion 2243, of the lower backrest plate 2242, while a downward force, caused by the gravity of the upper backrest plate 2241 itself, will be exerted on the upper backrest plate 2241. During the folding process, the pulling force F1 raises the end portion, near the unfolding-folding portion 2243, of the lower backrest plate 2242, and the end portion, away from the unfolding-folding portion 2243, of the upper backrest plate 2241 will be lowered under the effect of the gravity thereof. Also, the end portion, near the unfolding-folding portion 2243, of the upper backrest plate 2241 will be raised, such that the unfolding-folding potion 2243 is bent in a bending direction away from the ground 4. When the stroller frame 1 is folded, the seat portion 21 and the backrest portion 22 are also completely folded (as shown in FIG. 4b); that is, the angle formed between the seat portion 21 and the backrest portion 22 changes to C2 (folded) from C1 (unfolded), where C2 is smaller than C1. The bend formed at the unfolding-folding portion 2243 causes an arch of the backrest portion 22 at the unfolding-folding portion 2243, and the distance between the upper edge 2221 and the lower edge 2222 of the backrest portion 22 is reduced, thereby achieving folding of the backrest portion 22 and preventing the upper edge 2221 of the backrest portion 22 from touching the ground.

Figure 5:
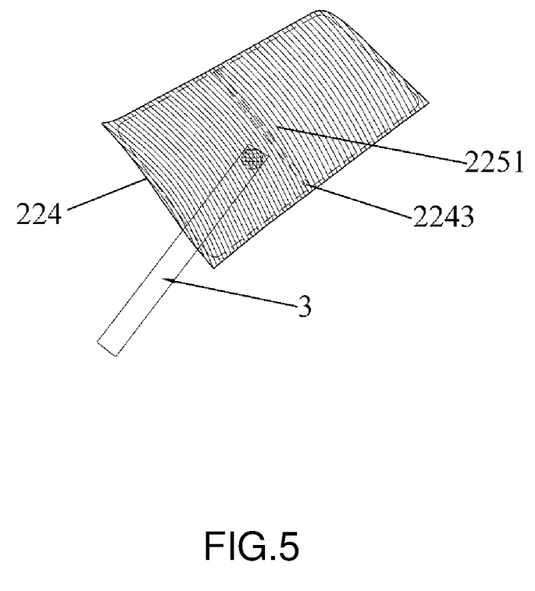
FIG. 5 is a schematic view showing the connection between the backrest plate and the connecting member according to an embodiment of the present invention.

Referring to FIG. 1, in order to make the pulling force exerted on the backrest portion 22 from the connecting member 3 uniform, according to the present invention, the connecting member 3 is preferably in a symmetrical arrangement on the two sides of the backrest portion 22. The backrest protection cover 225 may include a first backrest protection cover in direct contact with a baby. Referring to FIG. 5, the backrest protection cover 225 may further include a second backrest protection cover 2251. The outside of the backrest plate 224 may be directly covered by the second backrest protection cover 2251, and then the backrest plate 224 covered with the second backrest protection cover 2251 is embedded in the first backrest protection cover. According to the present invention, the connecting member 3 and the second backrest protection cover 2251 may be connected by means of sewing or by a rivet. Alternatively, the connecting member 3 and the second backrest protection cover 2251 may be connected by a fastener. Optionally, the outside of the backrest plate 224 is not necessarily covered by the second backrest protection cover 2251, and the connecting member 3 may be connected to the backrest plate 224 by means of fusion welding. More specifically, according to the present invention, the connecting member 3 is preferably a woven band, which is fixedly connected to the seat portion 21 by means of sewing or by a rivet. Optionally, the woven band and the seat portion 21 may be detachably connected by mutually coordinating male and female buckles.

Referring to FIG. 1 to FIG. 3, the upper backrest plate 2241 is provided with a shoulder strap hole 2245 for a shoulder strap 5 of a five-point safety belt to pass through. Preferably, the two sides of the upper backrest plate 2241 are respectively provided with two shoulder strap holes 2245, e.g. top shoulder strap hole and bottom shoulder strap hole, in a top-bottom facing manner, while an upper node of the shoulder strap 5 may be adjusted as desired between the two top and bottom shoulder strap holes 2245 on the same side to further adjust the height at which the shoulder strap 5 is applied, thereby adapting to the children of different heights. Preferably, the stroller frame 1 includes an armrest 11. The armrest 11 is of a collapsible structure, which is collapsed at a portion corresponding to the bending area 221 of the backrest portion 22. As such, the bending area 221 of the folded backrest portion 22 is pressed by the armrest 11, further ensuring that the upper edge 2221 of the backrest portion 22 will not touch the ground.

Again referring to FIG. 1 to FIG. 3, FIG. 4a and FIG. 4b, the backrest portion 22 of the stroller 100 with a linkage-foldable backrest includes the backrest plate 224. The backrest plate 224 includes the upper backrest plate 2241, the lower backrest plate 2242 and the unfolding-folding portion 2243. The unfolding-folding portion 2243 is bendable by a force exerted thereon, providing a bendable linkage connection between the upper backrest plate 2241 and the lower backrest plate 2242, and the connecting member 3 of a flexible structure is connected between the lower backrest plate 2242 and the seat portion 21. When the stroller frame 1 of the stroller 100 with a linkage-foldable backrest is folded, the seat portion 21 and the backrest portion 22 are folded synchronously. During the folding process, the connecting member 3 connected between the seat portion 21 and the lower backrest plate 2242 may pull the lower backrest plate 2242, so that the unfolding-folding portion 2243 bends in a direction away from the ground 4, and the end portion of the upper backrest plate 2241 near the unfolding-folding portion 2243 and the end of the lower backrest plate 2242 near the unfolding-folding portion 2243 are both raised. Thus, the distance between the upper edge 2221 and the lower edge 2222 of the backrest portion 22 is reduced, thereby achieving folding of the backrest portion 22 and preventing the upper edge 2221 of the backrest portion 22 from touching the ground. According to the present invention, the folding of the stroller frame 1 of the stroller 100 with a linkage-foldable backrest drives the backrest portion 22 to fold, and the folding of the backrest portion 22 prevents the edge of an end portion of the backrest portion 22 from touching the ground. Further, the folding operation of the backrest portion 22 is relatively simple and convenient, thereby making the invention suitable for extensive promotion and application.

It should be noted that, the folding structure of the stroller frame 1 of the stroller 100 may be generally known to a person skilled in the art, such that the details are omitted herein for clarity.

The disclosure above provides only preferred embodiments of the present invention and is not to be construed as limitations to the scope of claims of the present invention. Therefore, any equivalent modifications made within the scope of the appended claims of the present invention are to be encompassed within the scope of the invention.

What is claimed is:

1. A stroller with a linkage-foldable backrest, comprising:
a stroller frame convertible between an unfolded state and a folded state; and
a support provided on the stroller frame, wherein the support comprises a seat portion and a backrest portion capable of mutually unfolding and folding, the seat portion and the backrest portion are mutually unfolded and folded in synchronization relative to the stroller frame;
wherein the backrest portion is provided with a bendable bending area;
wherein the stroller frame comprises an armrest connected thereto and configured to press the bending area of the backrest portion so as to avoid an upper edge of an upper backrest plate from touching a ground under the folded state;
wherein the folding of the seat portion relative to the backrest portion drives the bending area to bend in a direction away from the ground such that the seat portion is positioned further from the ground than the upper backrest plate.

2. The stroller with the linkage-foldable backrest according to claim 1, the armrest is configured to collapse at a portion to provide a distance from an upper edge of the backrest portion to the ground.

3. The stroller with the linkage-foldable backrest according to claim 1, wherein the stroller comprises a connecting member of a flexible structure connected between the backrest portion and the stroller frame, wherein the folding of the seat portion relative to the backrest portion drives the bending area to bend in the direction away from the ground by pulling of the connecting member on the backrest portion, and the bending of the bending area reduces a distance between an upper edge and a lower edge of the backrest portion.

4. The stroller with the linkage-foldable backrest according to claim 3, wherein the connecting member is connected between the backrest portion and the seat portion on the stroller frame.

5. The stroller with the linkage-foldable backrest according to claim 1, wherein the bending area is formed between an upper edge and a lower edge of the backrest portion.

6. The stroller with the linkage-foldable backrest according to claim 3, wherein the backrest portion includes an upper backrest portion and a lower backrest portion separated by the bending area, and the connecting member is connected to the lower backrest portion.

7. The stroller with the linkage-foldable backrest according to claim 1, wherein the backrest portion comprises a backrest plate and a backrest protection cover covering the backrest plate.

8. The stroller with the linkage-foldable backrest according to claim 7, wherein the backrest plate comprises the upper backrest plate corresponding to an upper backrest portion and a lower backrest plate corresponding to a lower backrest portion.

9. The stroller with the linkage-foldable backrest according to claim 7, wherein the backrest plate further comprises an unfolding-folding portion connecting the upper backrest plate with a lower backrest plate.

10. The stroller with the linkage-foldable backrest according to claim 9, wherein the bending area is formed by the unfolding-folding portion.

11. The stroller with the linkage-foldable backrest according to claim 9, wherein the unfolding-folding portion provides for a bendable linkage connection between the upper backrest plate and the lower backrest plate.

12. The stroller with the linkage-foldable backrest according to claim 11, wherein the folding of the seat portion relative to the lower backrest plate drives the upper edge of the upper backrest plate in a direction towards the ground through the linkage connection provided by the unfolding-folding portion.

13. The stroller with the linkage-foldable backrest according to claim 9, wherein the unfolding-folding portion is of a flexible structure.

14. The stroller with the linkage-foldable backrest according to claim 13, wherein the unfolding-folding portion is of a creased structure.

15. The stroller with the linkage-foldable backrest according to claim 13, wherein the unfolding-folding portion is of a linear structure that is repeatedly bendable.

16. The stroller with the linkage-foldable backrest according to claim 3, wherein the connecting member is connected to a backrest plate by means of fusion welding.

17. The stroller with the linkage-foldable backrest according to claim 3, wherein the connecting member and a backrest protection cover are connected by means of sewing or by a rivet.

18. The stroller with the linkage-foldable backrest according to claim 3, wherein the connecting member is in a symmetrical arrangement on two sides of the backrest portion.

19. The stroller with the linkage-foldable backrest according to claim 3, wherein the connecting member is a woven band.

20. The stroller with the linkage-foldable backrest according to claim 19, wherein the woven band and the seat portion are fixedly connected by means of sewing or by a rivet.

21. The stroller with the linkage-foldable backrest according to claim 8, wherein the upper backrest plate is provided with a shoulder strap hole for a shoulder strap of a five-point safety belt to pass through.

22. The stroller with the linkage-foldable backrest according to claim 21, wherein the upper backrest plate is provided with a top shoulder strap hole and a bottom shoulder strap hole in a top-bottom facing manner on two sides of the upper backrest plate, respectively, and the shoulder strap includes an upper node that is adjustable between the top shoulder strap hole and the bottom shoulder strap hole on the same side of the shoulder strap.

* * * * *